June 5, 1934.                N. W. DE FREES                 1,961,924
                              SPRAYING DEVICE
                            Filed Oct. 1, 1931              2 Sheets-Sheet 1
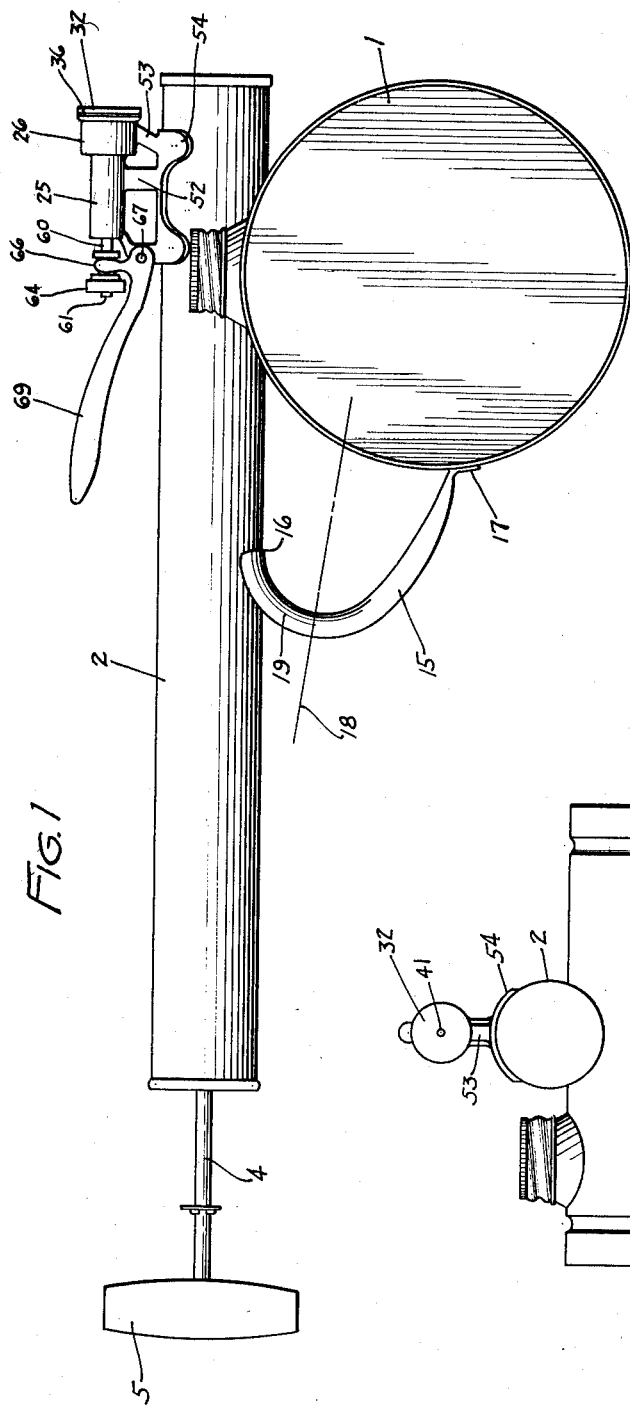
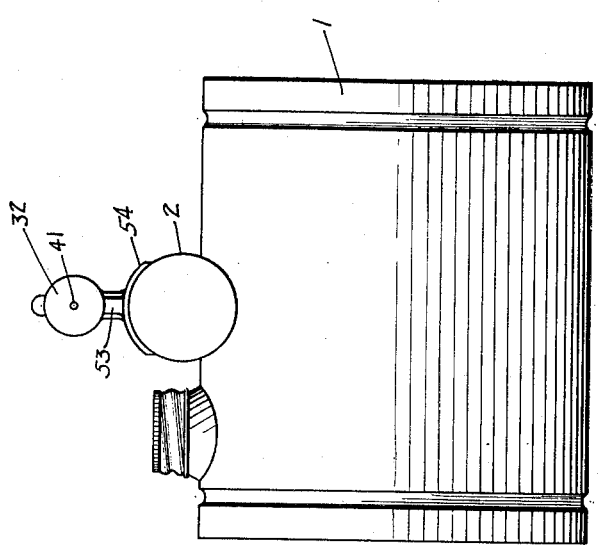
Inventor
NICHOLAS W. DE FREES
By Paul, Paul Moore
ATTORNEYS June 5, 1934.  N. W. DE FREES  1,961,924
SPRAYING DEVICE
Filed Oct. 1, 1931  2 Sheets-Sheet 2
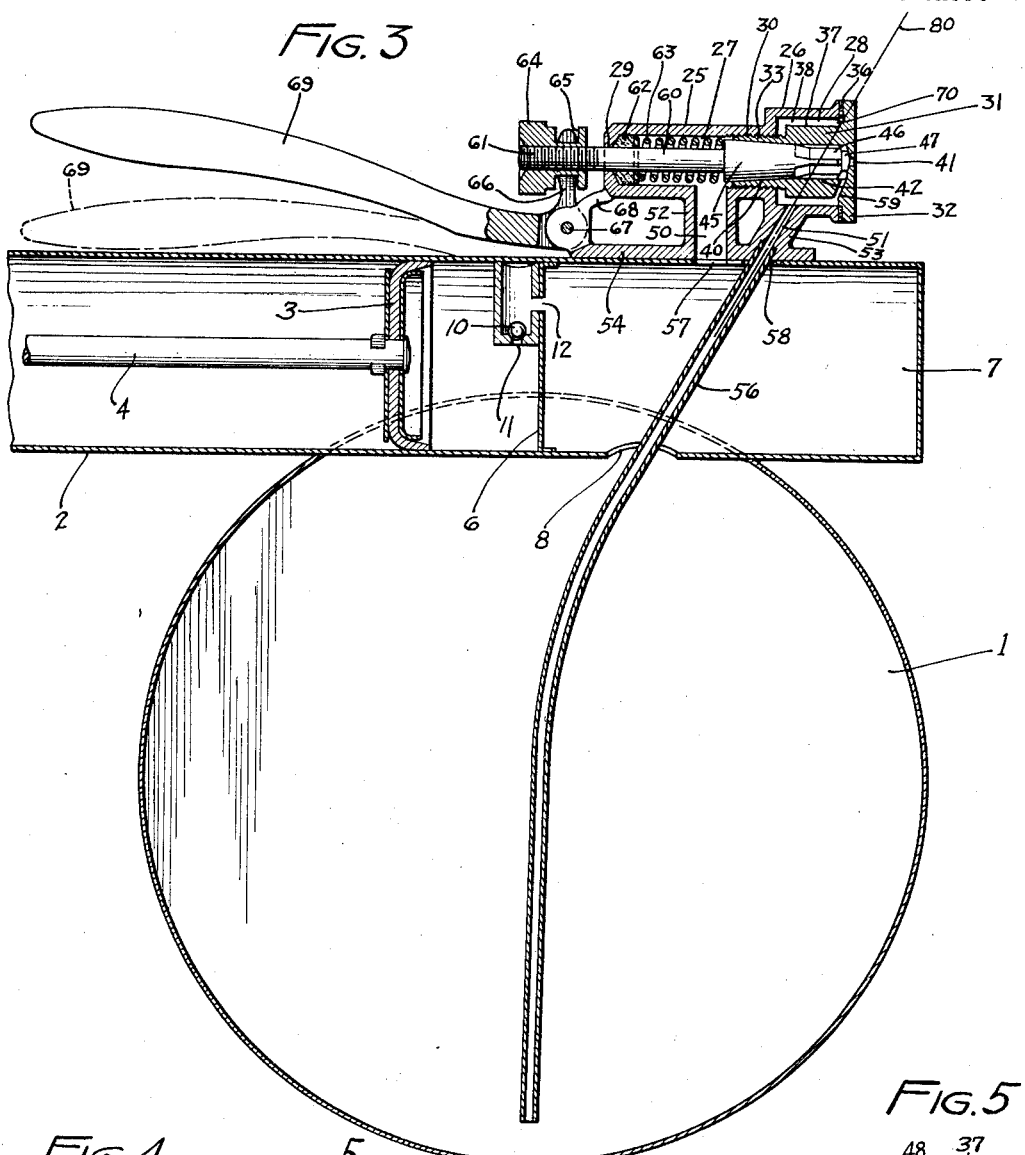
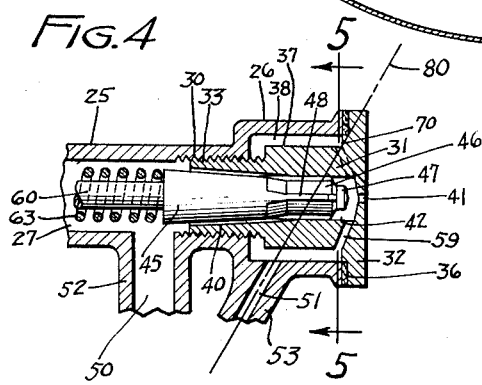
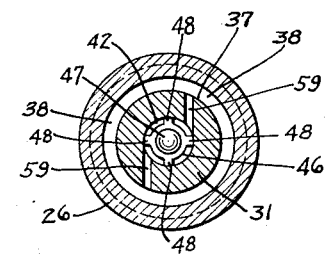
Inventor
NICHOLAS W. DE FREES
ATTORNEYS Patented June 5, 1934

1,961,924

UNITED STATES PATENT OFFICE 1,961,924

SPRAYING DEVICE

Nicholas W. De Frees, Hastings, Minn., assignor to H. D. Hudson Manufacturing Company, Chicago, Ill., a corporation of Minnesota Application October 1, 1931, Serial No. 566,214

2 Claims. (Cl. 299—89)

This invention relates generally to spraying devices of the type used, for example, for spraying insecticides, and particularly of a type adapted to be carried by the operator.

Objects of the invention are to provide a spraying control unit as a casting directly attachable to the pump, thus avoiding the soldering of tubes, etc., so unsatisfactory in devices of this kind; to place the unit so that it does not project forwardly of the forward end of the pump cylinder; to provide a novel form of valve for the purpose herein; to provide means for adjusting the throw of the valve operating lever; to provide a structure by means of which cleaning of the oil supply passages is facilitated; to provide a novel form of brace and carrying handle, and novel placement thereof with reference to the centers of gravity of the device for two angular positions, respectively when carrying and when in use; to so locate the brace that when the hand is between it and the tank, the hand naturally grips the pump cylinder at a point adjacent the center of gravity of the device; to so locate the valve operating handle that it is most easily operated when the hand grips the cylinder adjacent the center of gravity of the device, and in general to provide a sturdy structure for the purposes herein, which can be cheaply constructed, and the parts of which can be quickly and cheaply assembled.

Objects, features and advantages of the invention will be set forth in the description of the drawings forming a part of this application, and in said drawings Figure 1 is an elevation of the sprayer showing the pump cylinder in side view and the tank cylinder in end view;

Figure 2 is an elevation, viewing the end of the cylinder and the side of the tank;

Figure 3 is an enlarged sectional view taken longitudinally of the pump cylinder and transversely of the tank, illustrating the relations of the spraying control mechanism to pump and tank;

Figure 4 is an enlarged view of the valve mechanism; and

Figure 5 is a cross section on line 5—5 of Figure 4 further illustrating the valve.

First referring to Figure 1, numeral 1 indicates a supply tank, numeral 2 a pump rigidly secured to the tank in substantially tangential relation thereto, the axes of tank and pump being substantially perpendicular to one another. The pump has a piston 3 of the usual construction, see Figure 3, and also has the usual pump rod 4 and handle 5. The forward end of the pump is partitioned as at 6 to form a compressed air chamber 7 which has an opening 8 establishing communication between it and the tank 1. A suitable check valve 10 mounted on the partition 6 controls orifice 11 which orifice, with the orifice 12, establishes communication between the chamber 7 and the remaining portion of the pump barrel.

Again referring to Figure 1, a feature of the invention is the arrangement of a brace and handle 15, with respect to the barrel 2 and the tank 1. This brace 15 has the form of a segment of an ellipse and is attached by one end 16 to the pump as by soldering, and is similarly attached by the other end 17 to the tank. The major axis 18 of the segment is disposed at a slight angle to the long axis of the barrel so that the small end portion 19 of the segment is disposed immediately adjacent the barrel 2, and so that a suspension grip can be had which is near the center of gravity of the device as a whole, when the barrel axis is in a vertical position. Moreover, the end 16 of the brace-handle is so attached to the barrel and spaced from the tank that when spraying, the major portion of the hand grips that portion of the pump barrel which is nearest the center of gravity of the device, that is the brace is so arranged that the grip is applied immediately adjacent and substantially over the tank, and the mixing valve control lever 69 is so arranged that it is most easily controlled, if the hand is gripping the barrel near the center of gravity of the device.

A feature of the invention relates to the valve structure per se. Numeral 25 indicates a tubular casing enlarged at its forward end as at 26 and providing the communicating, axially aligned bore portions 27 and 28. The casing is bored at the rear as at 29 to provide a sliding bearing for a valve stem, and the bore portion 27 is threaded as at 30. A capping, valve seat-forming and valve-centering member is indicated at 31 and is provided with a reduced portion 33 having threads cooperative with the threads 30 for removably securing the head. The head has a capping portion 32 which cooperates with the end of the casing portion 26, to close the bore portion 28, a suitable gasket 36 being interposed as shown. The member 31 also has a cylindrical portion 37 of less diameter than the bore 28 which cooperates to form an annular chamber 38, surrounding the portion 37.

An important feature of the invention is the construction of the valve seat formed in the element 31. This seat is indicated at 40 and is of truncated conical formation and is convergent toward the discharge orifice 41, of the member 31. The tapered portion merges into the cylindrical centering-guide bore portion 42, which lies between the small end of the seat and the discharge orifice 41.

Cooperative with the tapered seat is a correspondingly tapered valve member 45. The forward portion of the tapered valve member 45 merges into a cylindrical portion 46 which is of less diameter than the cylindrical bore 42, and this reduced portion has longitudinally extending fins 48 which cooperate with the bore portion 42 to center the valve, and to provide a non-vibrating slide bearing therefor, and yet allow for free flow of fluid past the valve when open. The forward end of the reduced portion 46 has a socket (not shown) into which is fitted a plug-like valve 47 of leather or other suitable compressible material, which valve is cooperable with the discharge orifice 41 to cap and close it when the tapered valve is closed.

A feature of the invention is the sprayer control unit as a casting of skeleton frame configuration. The casting includes the bores 27—28, along with two tubular members providing passages 50—51. These members, respectively indicated 52—53, are integral with a plate-like foot portion 54, see Figures 1 and 2. This foot portion is suitably attached to the barrel as by soldering, and the barrel is provided with openings 57—58 respectively in register with the bores 50—51. A liquid supply tube 56 is socketed in the tubular member 53 to form a continuation of the passage 51, and this tube traverses the compressed air chamber 7 and the opening 8, and extends somewhat diametrically across the supply tank as shown. The bores 50—51 respectively establish communication between the chamber 7 and the bore 27 at one side of the valve, and between the annular channel 38 and the tank at the other side of the valve.

Another feature relates to the tangential arrangement of the passages 59 (see Figure 5) at opposite sides of the bore 42. By this means, the liquid is sucked in at the outer periphery of the bore and given a whirling motion which facilitates mixture with the compressed air. It will be noted that the diameter of the air intake bore 50 is substantially greater than that of the bore 51.

The valve 45 is provided with a stem 60 and this stem slides in the opening 29 and projects beyond the casing 25 and is threaded as at 61. Suitable leak-proof stuffing 62 is inserted as shown, and a spring 63 normally forces the valve to closed position. A nut 64 is in threaded engagement with the threads 61, this nut being provided with a circumferential groove 65 within which is engaged the forked arm 66 of a bellcrank lever 69. This bellcrank lever is pivoted at 67 to a web-like connecting member 68 which is an integral part of the spray control unit. By means of the nut 64 the throw of the lever can be adjusted to correspondingly vary the degree of translation of the valve. This is a feature. The lever 69 is so arranged as to be most readily operable when the hand grips the barrel at a location which substantially corresponds to the center of gravity of the device when in use.

Insofar as I am aware, the art has never provided a tapered valve of any type, for the purposes herein, which is so arranged or mounted as not to be disaligned in some manner to result in variations of the mix, and to result in quick wear, and frequent repair. The tapered valve 45 is held in alignment at two points respectively at opposite sides of it, that is at the opening 29 and at the bore 42.

Another and important feature of the invention is the location of the axis of the passage 51 to bore 28, and its relation to the uppermost portion of the outer periphery 70 of this bore. It will be noted that the passage 51 is directed upwardly and forwardly generally in the direction of spray, and that an extension of the axis of this passage cuts an extension of the uppermost wall portion of the bore 28, at a point beyond the enlarged portion 26. By this means, a straight wire can be inserted into the passage 51 and tube 56 for cleaning them, the insertion, of course, being made after the member 31 is removed. Moreover, this insertion for cleaning can be made without removing the valve 45, but by simply lowering the handle 69 to the dotted line position to draw the valve elements rearwardly of the axis line 80. This is a valuable feature of the invention.

The tapered valve and seat is particularly advantageous in a device of this kind because, by the use of such a valve, a very small translative motion of the valve is necessary (the total motion being about half an inch). By this device, no extra needle or other valve is required, although the delicacy of adjustment is as fine as that of a needle valve adjustment, without any of the attendant objections such as mis-alignment, etc. The truncated cone formation of the valve has the advantage of ruggedness over that of any needle valve construction. A proportioning valve is thus provided, which simultaneously controls entrance of air to the mixing point as well as exit of mixed liquid and air. The plunger is tapered toward the discharge orifice, so that in accordance with the direction of motion of the valve, the volume of admitted air is increased or decreased exactly proportionately to the degree of motion, the amount of admitted air proportionately increasing as the distance of the apex of the plunger from the orifices increases, and vice versa.

I claim as my invention:

1. In a spraying apparatus, a supply tank, an air pump having a barrel attached to the tank, a spraying control unit mounted upon the barrel and including a skeleton frame structure as a casting and having therein means for controlling a mixing and spraying operation, said skeleton frame including first and second tubular members which are integral with a connecting foot member by which the unit is attached to the barrel over a relatively large contact area, said tubular members respectively establishing communication between the barrel and the mixing and spraying controlling means and between the tank and said means, a tube in communication with the tank supply and with the second tubular member, said tube passing loosely through an opening in said barrel which opening establishes communication between the tank and barrel.

2. In a spraying apparatus, a supply tank, an air pump having a barrel attached to the tank, a spraying control unit attached to the barrel, and providing valve means for controlling and mixing air and liquid, including an enlarged terminal chamber, a cap for closing said terminal chamber, said cap providing a discharge orifice, passages by which air and liquid are supplied in a manner to be controlled by said controlling means, including a passage for liquid leading slantingly forwardly and upwardly and opening into said chamber at its bottom so that the axis of the passage substantially cuts that periphery of the chamber which is most remote from the delivery end of the passage, and a tube connected with the passage and extending into the supply tank, whereby after removal of the cap a straight cleaner-wire can be inserted into the passage and into said tube.

NICHOLAS W. DE FREES.